March 10, 1970  C. J. TAVARES  3,499,292
METHOD OF MAKING PARTIALLY SUBMERGED STRUCTURES
Filed Dec. 20, 1968  2 Sheets-Sheet 1
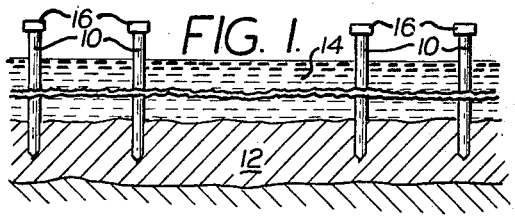
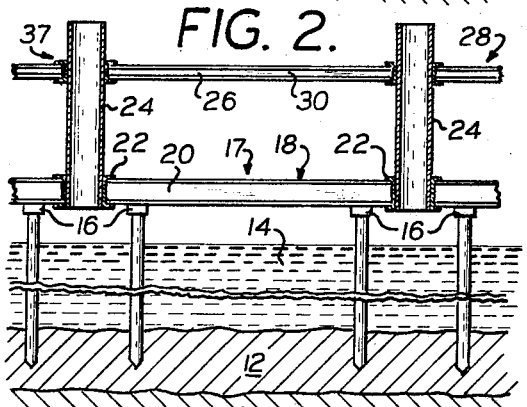
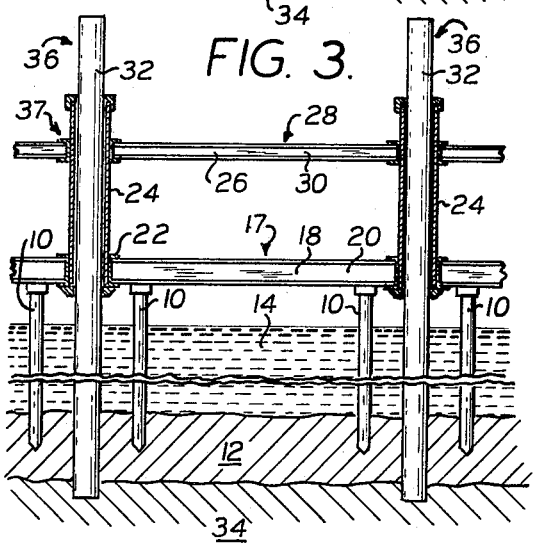
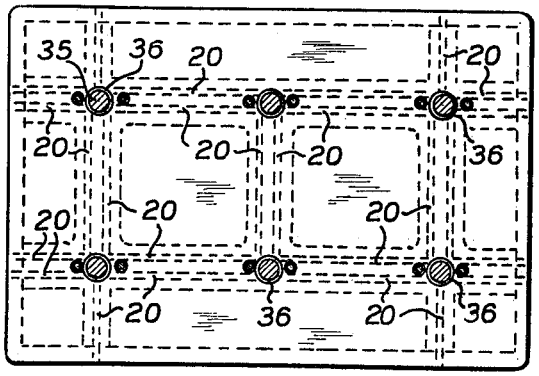
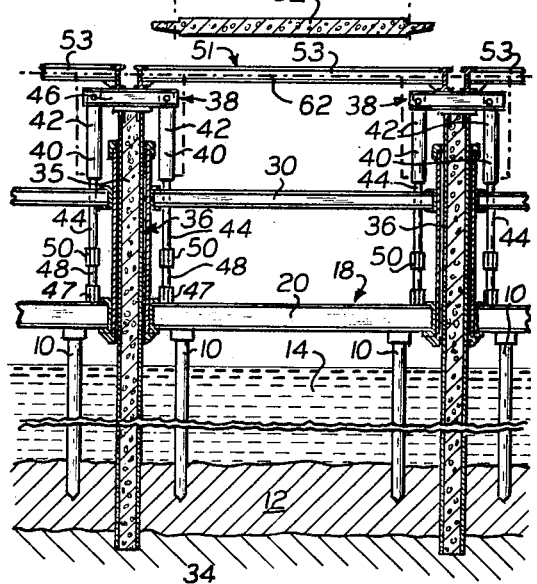
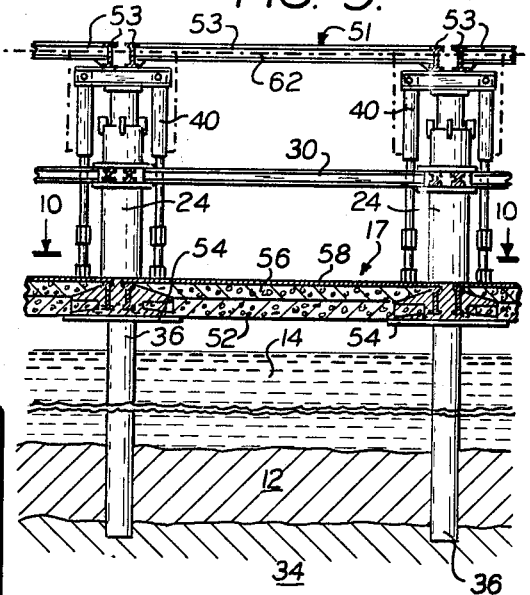
INVENTOR
CARLOS J. TAVARES
BY
ATTORNEYS.

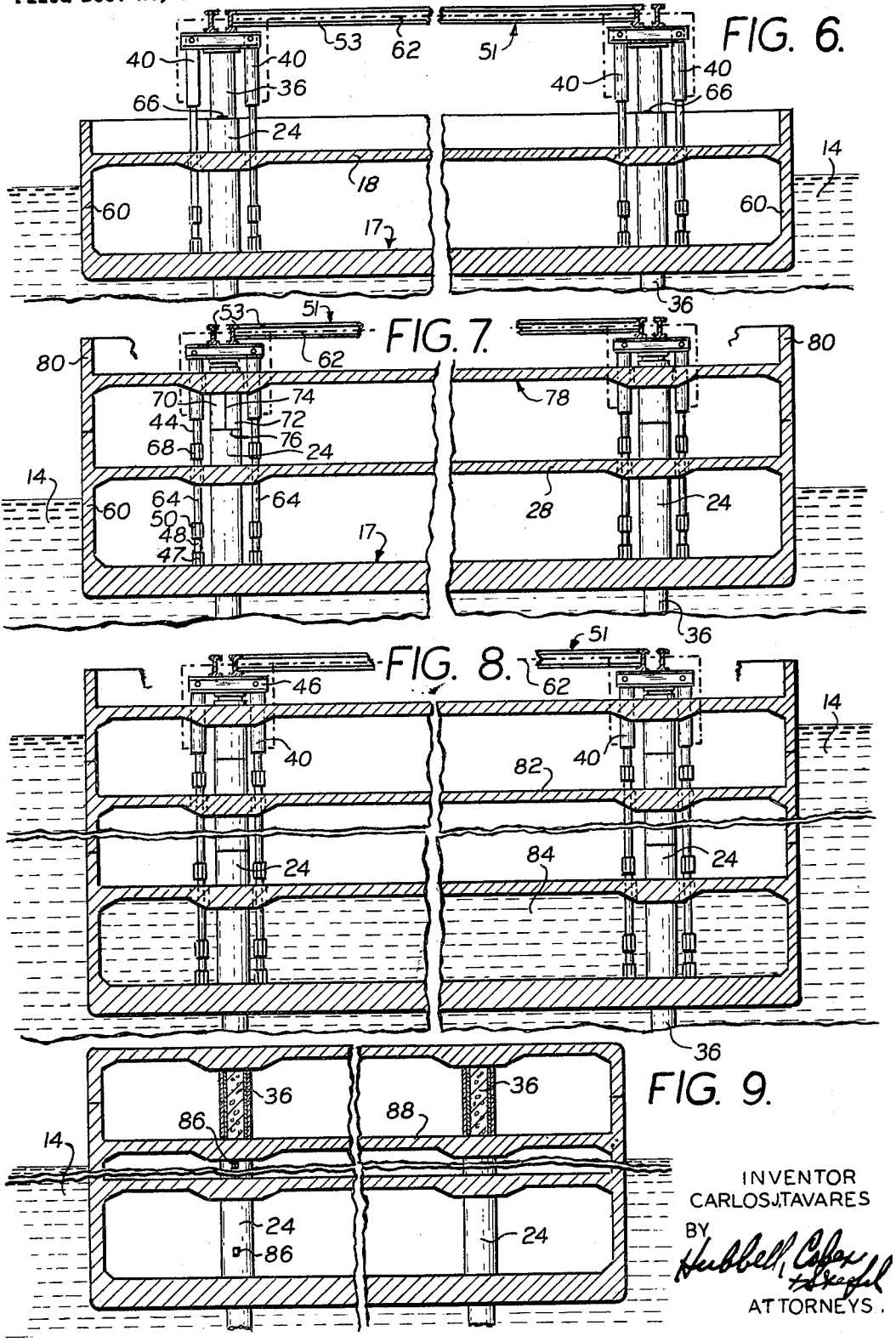

United States Patent Office 3,499,292
Patented Mar. 10, 1970

3,499,292
METHOD OF MAKING PARTIALLY SUBMERGED STRUCTURES
Carlos J. Tavares, San Diego, Calif., assignor to Marine Space Enclosures, Inc., New York, N.Y., a corporation of New York
Filed Dec. 20, 1968, Ser. No. 792,890
Int. Cl. E02b 29/06, 17/00; E04b 5/16
U.S. Cl. 61—46                                  17 Claims

ABSTRACT OF THE DISCLOSURE

Piles are driven into the bottom underlying a body of water, preferably into bedrock. Columns in the form of sleeves are disposed about the piles and are releasably restrained from downward movement relative thereto. A lowermost floor is constructed utilizing the sleeves as supports therefor, and vertically extending outer walls are erected from the bottom floor structurally upwardly one level. A second floor structure is then built using the sleeves as supports therefor and thereafter the structure is permitted to move downwardly toward or into the water under the urging of gravity, the downward movement being controlled as by jacks. Thereafter, additional outer walls are constructed and joined to the second floor and a third floor is constructed which third floor uses the sleeves as supports. Thereafter, the sleeves are lowered further into the water. The above described steps are continued until the desired amount of structure is submerged in the water. If hydrostatic pressure prevents the submergence of an adequate volume of structure, the structure may be temporarily flooded in order to overcome hydrostatic pressure and permit gravity to move the constructed floors downwardly into the water. Finally, an above water level structure is constructed using the piles as supporting columns therefor which structure provides the necessary weight to overcome hydrostatic pressure. Preferably, after the submerged portion has been constructed in accordance with the above method, the sleeves are fixed as by keys to the piles to prevent further relative movement therebetween.

BACKGROUND OF THE INVENTION

Field of the invention

The present invention relates to a method for constructing a partially submerged building.

Description of the prior art

When structures are to be constructed over water, generally pilings are driven through the bottom, preferably to bedrock, and a platform is disposed on the pilings. Thereafter several floors of enclosed building structure can be built over the platform. Such a structure has no sub-ground level volume and, therefore, is costly on a per cubic foot basis.

When it is desired to have below ground level enclosed volume, the prior art normally requires using ground fill to displace the water. The filling operation is time consuming and costly. After the filling has been completed, it is generally necessary to permit the fill to settle for a period of several years, which waiting time is very costly. Then much of the fill which has been carted to the site is excavated and removed therefrom so that a relatively conventional building with sub-surface enclosed volume may be constructed in a relatively conventional manner.

SUMMARY

Temporary piles are driven into the bottom underlying a body of water and their tops are rendered horizontal and coplanar. Steel structure is then laid on the temporary pilings to define the steel reinforcement for the bottom floor of the structure which steelwork includes a plurality of vertically extending hollow sleeves which will form the vertical supports for the submerged portion of the structure. Once the steelwork is constructed, the sleeves define the position and vertical orientation for permanent piles which are driven therethrough in the form of hollow cylinders of substantially smaller diameter than the sleeves. The cylinders are driven into the bottom, preferably into bedrock. Thereafter the hollow cylinders are filled with concrete whereby to form solid vertical pilings.

A suitable lowering means is affixed to the tops of the permanent pilings and secured to the sleeves to releasably prevent downward movement of the sleeves relative to the permanent pilings. The bottom floor concrete may then be completed, either by precast concrete or cast-in-place concrete or both and the temporary pilings may be removed, the bottom floor load now being taken up completely by the hollow sleeves which in turn are secured to the lowering means fixed to the permanent piles. Peripheral walls may then be constructed and secured to the bottom floor of the partially submerged structure and then a second floor of the partially submerged structure may be formed utilizing the hollow sleeves as the vertical columns for supporting said second floor. After completion of the second floor, the lowering means may be actuated to permit the portion of the partially submerged building now completed to move downwardly under the urging of gravity into the water. The steps above described with respect to constructing the lowest and second floor structures and the peripheral wall therebetween may be repeated a number of times with the structure being lowered incrementally as desired to maintain a convenient working height with respect to the structure. In this way the structure is lowered downwardly into the water to the desired depth.

It is generally preferred to relay on gravity for urging the submerged portion of the structure downwardly into the water. If hydrostatic pressure interferes with the force of gravity being effective for this purpose, the lower portions of the submerged structure may be flooded temporarily to overcome the hydrostatic pressure and thereby enable gravity to take effect.

After the submerged portions of the partially submerged buildings have been constructed in accordance with the above described method, the vertically extending sleeves are keyed to their associated permanent pilings as by rods or the like being driven through the sleeves and through the pilings, whereby to fix the sleeves relative to the pilings. Thereafter grout may be poured into the space between the sleeves and the pilings to assure sound construction. Subsequently, the portion of the building which is not submerged can be constructed above water level to a desired height and preferably of sufficient weight to overcome the hydrostatic pressure of the water operating on the submerged portion of the building.

BRIEF DESCRIPTION OF THE DRAWINGS

FIG. 1 is an elevational view, partly in section, illustrating an initial step in the method of constructing a partially submerged building;

FIGS. 2 through 9 are views similar to FIG. 1 but illustrating successive steps in the method involving the present invention;

FIG. 10 is a sectional view taken along the line 10—10 of FIG. 5.

DESCRIPTION OF THE PREFERRED EMBODIMENTS

The present method will be described in connection with a particular technique and apparatus for achieving the desired result therefrom. However, it will be recognized that the present method can be carried out by other apparatus and other techniques without departing from the spirit of the present invention. Moreover, the herein described sequence of steps, while preferred, is not in many instances necessary to the method, and other sequences may be employed.

In accordance with the presently preferred embodiment of the invention, a multiplicity of temporary pilings 10 may be driven into the bottom 12 underlying a body of water 14 as a preliminary step. The temporary pilings 10 may be made of any suitable material such as, for example, wood. While the pilings 10 may be driven to bedrock, this is not necessary and is probably not even desirable. As will be pointed out hereinafter, the advantage of utilizing temporary pilings 10 is that the initial or temporary pilings 10 need not be driven into the bottom 12 at precise locations nor need they be plumb for reasons which will become more apparent hereinafter. The only requirement is that they not be located in positions which conflict with the erection of additional structure as will be described subsequently.

After the temporary pilings 10 have been driven into the bottom 12 as above described, their tops are all leveled, that is placed in the same horizontal plane, as by sawing or additional driving of the piles or the like. Thereafter, if desired, flanged supports 16 are secured to the tops of the temporary pilings 10 to provide a firm platform for structure to be constructed thereabove. It will be recognized that the temporary pilings 10 can be driven by conventional pile drivers which may be on barges or the like, if desired, well known De Long platforms may be positioned adjacent the construction site to support the pile drivers. De Long platforms are described in U.S. Patent No. 2,972,234 and the description thereof is incorporated herein by reference.

With the tops of the pilings all horizontally coplanar and above the high water mark, work can proceed to construct the bottommost floor of the partially submerged structure while it is above water level. As shown herein and as presently preferred, the bottommost floor 17 includes steelwork 18 which preferably forms a horizontal supporting grid for concrete flooring as will be described hereinafter. As shown in FIG. 2, a number of steel beams 20 are laid on the tops of the temporary pilings 10 to form the gridwork. Preferably, for reasons which will become apparent hereinafter, most of the steel gridwork is defined by pairs of parallel beams, as best seen in FIG. 10, which beams are anchored to cylindrical bushings 22 as by welding, riveting or the like. The bushings 22 have disposed therewithin in close fitting relationship therewith upstanding hollow cylindrical sleeves 24, preferably of steel, which sleeves will ultimately serve as the supporting columns for the submerged portion of the structure being constructed. Bushings 22 are fixed to sleeves 24, as by welding or riveting.

As will be more fully understood hereinafter, the sleeves 24, among other functions, serve to index permanent pilings which will be passed therethrough. Thus, to assure the accurate location of the sleeves 24 and their vertical orientation, preferably at this point the steel structure 26 for a second floor or story 28 is constructed using sleeves 24 as its vertical support as through bushings 29. While the steelwork 26 may be lighter than the steelwork 18 of the lowermost floor, generally speaking, it is preferred that the beam arrangement be somewhat similar to the arrangement of the beams in the steelwork 18, especially with regard to the use of spaced apart parallel pairs of beams 30 for reasons which will become apparent hereinafter. At the conclusion of the erection of the steelwork for the second floor or story 28, the structure will appear as illustrated in FIG. 2.

Using the sleeves 24 as guides, hollow pipes 32 of smaller outside diameter than the inside diameter of the sleeves 24, are slidably dropped through the sleeves and through the water 14 underlying the sleeves until they impinge on the bottom 12. Thereafter pile drivers, which are either barge mounted or mounted on De Long platforms, are employed to drive the hollow pipes 32 through the bottom 12 and preferably solidly into the bedrock 34 thereunder whereby to permanently affix the pipes 32 in the positions illustrated in FIG. 3. Thereafter, the pipes are preferably filled with concrete 35 whereby to form permanent pilings 36.

It will be recognized that the above described order of events is not necessary to practicing the present invention. Thus for example the step of disposing the temporary pilings 10 into the bottom 12 can be omitted altogether and the method could start with the driving of the permanent pilings 36 into the bottom and preferably into the bedrock thereunder as, clearly, current technology is available for assuring that pilings are disposed accurately with respect to horizontal coordinates and are in plumb. If such order were employed the sleeves 24 would preferably be slidably disposed about pilings 36 after the driving of the pilings 36. However, the illustrated method is preferred as being one that greatly facilitates the accurate location and plumbing of the permanent pilings 36.

Referring now to FIG. 4, after the permanent pilings 36 are in place as illustrated therein, suitable lowering means 38 are attached to the tops of the pilings 36 for securement to the steel structure 37 made of sleeves 24 and steelwork 18 and 26, preferably constructed as shown in FIG. 2, and for the subsequent lowering of that structure into the water 14. As shown herein and as is preferred, the lowering means 38 associated with each piling 36 comprises a pair of hydraulic jacks 40 each having a piston 44 and a cylinder 42. As shown in FIG. 4, the cylinders 42 of the hydraulic jacks 40 are secured to cross pieces, in the form of I-beams 46, which are mounted on the tops of the permanent pilings 36. The jacks 40 extend downwardly from the outer ends of the cross pieces 46 and the external portions of the pistons 44 extend downwardly between the pairs of parallel beams 30 and are secured to upstanding lugs 46 that are fixed to adjacent parallel beams 20 of gridwork 18. It is to provide clearance for pistons 44 that the twin parallel beam construction is preferred. As shown in FIG. 4, the external portion of piston 44, is not long enough to extend from the cylinder 42 to the beams 20. Accordingly, a short extension piece 48 is connected between the bottom of the piston 44 and the lug 47 and is secured to the piston 44 as by a suitable coupling 50. Of course, the piston 44 can be proportioned in the first instance to extend down to and be connected to the lugs 47. Lugs 47 are firmly secured to beams 20 whereby to secure the jacks 40 to the steel structure 37. Preferably, after positioning the jacks as above described, the tops of the permanent pilings 36 are braced against one another to render them rigid and fixed, the bracing being accomplished preferably by a gridwork 51 of I-beams 53 which extend between the tops of the pilings 36, with the cross pieces 46 preferably interposed between the bracing I-beams and the tops of pilings 36, as illustrated.

After the jacks 40 are secured to the beams 20 and to the crosspieces 46 and the pilings are braced by steelwork, the jacks 40 are adjusted to be of uniform length and are subjected to sufficient tension to support the steelwork structure 37. Accordingly, at this point, the temporary pilings 10 may be removed from beneath the steelwork 18, as by divers or the like, whereby to remove obstruction to the downward movement of the structure 37 relative to the permanent pilings 36. Thereafter, or prior to the removal of the temporary pilings 10 if desired, the bottom floor may be completed as by placing precast slabs 52 in place by resting them on conventional steel stems 54 which are secured to the I-beams 20. Subsequently, preferably, cast-in-place concrete is poured over the precast slab 52, the cast-in-place concrete being designated by the reference character 56. To finish off the bottom floor, a finishing layer 58 may be poured thereafter. The structure will then be in the condition illustrated in FIG. 5.

Thereafter, an outer peripheral side wall 60, preferably of precast concrete, although cast-in-place concrete may be employed as well, as may also be employed other materials, is erected around the outer perimeter of the bottom floor 17 and upwardly therefrom and is preferably extended at least to the level of the second floor 28. If desired at this time, the second floor concrete or other flooring material may be disposed on the second floor steelwork 26. For example, precast slabs 52 may be placed on the steelwork 30 to complete the second floor level. Naturally, cast-in-place concrete may be employed for this purpose or a combination of both. Irrespective of the form of flooring, clearance should be provided for piston 44 or its extensions to facilitate the introduction of additional piston extensions and their ultimate removal.

At some point after completion of the bottom floor 17 and an upward extending portion of the peripheral sidewall 60, the hydraulic jacks 40 are operated in unison to extend themselves whereby to cause the entire structure to move downwardly under the urging of gravity by virtue of the sleeves 24, which are the central vertical supports for the structure 37, sliding on the permanent pilings 36. The uniform lowering of the jacks 40 is substantially automatic due to the fact that all of the jacks 40 are preferably connected by a common hydraulic line 62 so that all operate together.

The structure is lowered preferably gradually and to the full extent of the stroke of the jacks 40, which stroke may be of any desired distance and preferably of the order of two to twelve feet. Upon lowering the structure as above described, it will assume the condition illustrated in FIG. 6 in which bottom floor 17 is immersed and second floor 28 is just above the water line. At this point in the method, means are introduced for temporarily fixing the sleeves 24 to the permanent pilings 36, whereby to enable the pistons 44 to be detached from structure 37, as at couplings 50, to add an additional length of piston extension 64 as will be described hereinafter. Preferably the means for temporarily fixing the sleeves 24 to the pilings 36 are weldments 66. However, other means of fixing the sleeves 24 to the permanent pilings 36 could be employed such as, for example, cables, rods, additional jacks or the like.

Irrespective of the manner of temporarily fixing the sleeves 24 to the pilings 36, upon this being achieved, the jacks 40 are detached from the structure under construction, as by uncoupling the extended pistons 44 from the couplings 50, and thereafter the jacks are retracted so that the piston will assume the position of FIG. 7 with the lower end of piston 44 spaced from the coupling 50 by the distance of the stroke of the jack, e.g., ten feet. In the space between the lower end of piston 44 and the coupling 50, a piston extension 64 is interposed and is connected to the lower end of piston 44 by a coupling 68 and is connected to the structure 37 through the coupling 50. At or about the same time, an additional length of sleeve 24 is added above the original portion thereof as by disposing two semi-cylindrical sleeve portions 70 and 72 about the now unsurrounded upper end of the permanent pilings 36 (it having been cleared by the downward movement of the structure). The two semi-cylindrical sleeve portions are then welded to each other along the seam 74. The weldments 66 may be broken at or about the same time, as melting them, as the structure is now once again supported by the retracted jacks 40 with the extensions 64. Then a circumferential weld is made to connect the now joined semi-cylindrical portions 70 and 74 to the upper edge of the original portion of the sleeve 24, the weld appearing along the upper edge of the sleeve 24 at the seam 76.

Having moved the structure 37 downwardly and built the sleeve 24 upwardly, and conditioned the jacks 40 for additional downward movement of pistons 44, a third floor structure 78 may be constructed using the extended sleeves 24 as the vertical supports therefor, preferably in a manner substantially the same as that employed for the second floor structure 28. The peripheral side wall 60 is also extended upwardly from the second floor level 26 and preferably beyond the third floor level 78, as at 80, whereby to enclose or encase the third floor level.

After the completion of the structure as above described (FIG. 7), the jacks 40 are again operated in unison to permit the lowering of the structure relative to the permanent pilings 36 as by sliding the sleeves 24 downwardly thereon, the lowering being done gradually and uniformly over a period of perhaps several hours. When the jacks 40 have once again been extended, the steps above described for erecting and lowering floor 78 may be repeated with respect to the erection of additional upper submergible levels 82. Naturally, prior to the construction of each additional level 82, the sleeves must be temporarily fixed to the permanent pilings 36, as by weldments 66, the jacks 40 must be detached from the structure by decoupling the pistons 44 from the remainder of the piston extensions, the jacks 40 must then be retracted, to thereby provide for the inclusion of additional piston extensions, which effectively reconnect the jacks to the structure, the temporary weldments or other fixing means must be broken or detached, the sleeves 24 must be extended upwardly as above described, and additional floor levels 82 must be constructed in supported relation with said sleeves or extended sleeves 24, and peripheral side wall 60 is extended an additional story. Clearly the number of additional submerged floors 82 which may be constructed is a function of building design. Preferably, after each floor is so constructed, the jacks 40 are operated in unison for extension, whereby to cause the buildings to move downwardly one floor height, by sliding the sleeves 24 on the permanent pilings 36.

At some point in the construction of the submerged portion, a sufficient amount of the submerged structure may be submerged so that the hydrostatic pressure on the submerged portion will support the weight of the completed structure, whereby to prevent further downward movement of the structure by gravity alone. At this point several options are available. Thus, for example, the jacks 40 may have sufficient thrust to force the submerged portion of the building further downwardly into the water against the hydrostatic pressure. However, this is not a particularly desirable way of overcoming the problem. The presently preferred manner of solving the problem of hydrostatic pressure is illustrated in FIG. 8, where a portion of the submerged part of the structure under construction is flooded as at 84, whereby to reduce the overall hydrostatic force and permit gravity again to work to move the building further downwardly. Naturally, if flooding or partial flooding is employed in this manner, at some point after the downward movement of the building is completely accomplished, the flooded portion should be pumped out.

At some point after the downward movement of the structure is entirely completed, the sleeves 24 are permanently fixed to the permanent pilings 36. This may be accomplished by welding the sleeves to the permanent piling pipes 32, or by driving one or more keys through both the sleeves and their respective permanent pilings 36. As shown in FIG. 9, keys 86 extending diametrically through sleeves 24 and pilings 36 have been employed to secure the sleeve 24 to the permanent pilings 36.

One of the major advantages of the present construction method is that with a significant portion of the completed building submerged as already described, there is a substantial upward hydrostatic force acting on the building which hydrostatic force is preferably overcome by building one or more unsubmerged floors to the structure above the water line. As exemplary of this, one unsubmerged floor 88 is shown in FIG. 9, which unsubmerged floor utilizes the permanent pilings 36 as its supporting columns. Clearly the number of unsubmerged floors 88 required to cancel out the hydrostatic pressure is a function of the geometry of the submerged portion and the weight of the structure, but the number of floors 86 desirable for this purpose is readily calculable by persons skilled in the art. Of course, the completed structure is not limited to having the precise number of floors above water line needed to cancel out hydrostatic pressure. More or less than that number may be constructed.

After completion of the submerged portion and the immersion thereof, and preferably after the securing of the sleeves 24 to the permanent pilings 36, the piling bracing 51 may be removed and the jacks 40 are removed, as may be their horizontal supports 46. Thereafter, the tops of permanent pilings are exposed to function as the main columns for supporting the above the water line floor structures 88.

Also, after completion of the submerged portion, and preferably after the securing of the sleeves 24 to the permanent pilings 36, grouting is poured into the annular space between the pilings 36 and the sleeves 24 whereby to render them a substantially unitary body.

Also, either as the building construction progresses or at or near the completion of the submergible portion thereof, any necessary caulking to render the structure substantially watertight should be performed. Thus, for example, it might be desirable to caulk any seams between the peripheral side walls 60 and the bottom floor 17 prior to moving that bottom floor into the water 14 as per FIG. 6. Any seams between the upper floors and the peripheral side wall should also preferably be caulked prior to immersion thereof. However, if desired, assuming any leakage would be relatively slight, the caulking can all be deferred until after completion of the submerged portion.

Having described the preferred form of practicing the invention, various modifications will be apparent to the skilled art worker. Thus, for example, while it is preferred to lower the contemplated structure incrementally, story by story for example, this is not necessary to practicing the invention and the entire structure, or at least the entire submerged portion of the structure into the water above the water line and completed prior to lowering the entire submerged portion of the structure into the water 14. Another possible modification of the above method is that the sleeves 24 need not be lengthened incrementally as the method proceeds and as has been described, but could be initially introduced into the structure as at FIG. 2 to their full length. In addition, it will be recognized that various other means and methods for lowering the structure may be employed. Thus, for example, in lieu of hydraulic jacks, screw jacks, winches or the like may be employed. In this connection it should be noted that in the preferred embodiment described and illustrated herein, there are a pair of hydraulic jacks 40 associated with each permanent piling 36. Preferably, each of the hydraulic jacks 40 is adequate to carry the entire load to which the pair will be subjected during the process. Thus, if any one jack in a pair should fail, this would not interfere with the process proceeding as described. Naturally, the process could be performed utilizing one jack per piling or even fewer than that, assuming the jacks are strong enough to handle the substantial loads to which they will be subjected. Alternatively, for additional safety, three or more jacks per piling 36 could be employed. However, it is presently believed that two jack, each of sufficient strength to handle the full load to which the pair will be subjected, should provide adequate safety and smooth operation. Another manner of lowering the building is by securing underneath the bottom floor structure 17 pontoons which would have sufficient flotation power to support the structure in the condition shown for example in FIGS. 2 and 3. After removal of temporary pilings 10, if they are used, as additional portions of the building are added, the weight would cause the pontoons to gradually sink lower into the water, whereby to permit the sleeves 24 to slide downwardly on the permanent pilings 36 to lower the building. This could be controlled to operate incrementally by periodically fixing and releasing sleeves 24 from pilings 36, as by weldments, etc. If the weight of the building were not sufficient to move the pontoons downwardly at the desired rate, partial flooding of the pontoons could be employed to achieve the desired rate. Subsequent flooding of completed and submerged portions of the buildings, as in FIG. 8, could be employed to contribute to the lowering, in accordance with this modification. Further, it will be recognized that the sequence of steps in the method, as described in detail above or as modified by various modifications suggested hereinbefore, is not necessary to practicing the invention and other sequences may readily suggest themselves to the skilled art worker within thescope of this invention.

However, irrespective of the particular means for practicing the present invention and irrespective of the sequence steps employed in practicing the present invention, it will be clear to those skilled in the art that by employing the present method there are many advantages. First of all, there is no need in erecting structures over existing water to first fill in the volume with dirt fill, then to wait a period of years for the dirt fill to compact, and then to excavate a substantial portion of the dirt so filled in order to construct a building. This eliminates substantial expense presently experienced in constructing at waterfront sites such as for piers and the like, and greatly accelerates the time of construction. In addition, the entire construction takes place above water line which greatly facilitates the method. Further, it will be seen that there is no need to excavate the water bottom and thereafter to fill and provide for a foundation for the structure thereon since the structure need not rest on the bottom nor have a fill thereunder, the structure being firmly secured to permanent pilings 36 that have been driven securely into the bedrock and are held thereby. It will also be recognized that the sleeves 24 which form a portion of the means for lowering the submerged structure into the water also form the structural columns for supporting the lower portion of the building. In addition, the permanent pilings 26 extending above the sleeves may form the supporting columns for the upper portion of the building so constructed, that is the portion above water line.

Thus, an inexpensive, readily practiced, rapid method of constructing structures over presently water covered areas has been devised. The method can be used to great advantage at the waterfront for the construction of piers and the like and the submerged portion of the structure may be employed for freight storage, parking garages, or for any other suitable purpose. In addition, a substantially tall above water line structure portion may be readily supported due to the presence of the hydrostatic pressure on the submerged portion. That is to say, the upper portion of the structure, that is stories 88 in FIG. 9, actually not only serve to provide additional volume for the building, but they provide the necessary weight to hold the building down against the hydrostatic pressure exerted by the water 14 on the submerged portion of the building. In general today, piers are constructed on pilings with no useable building volume below street level. Thus, with the present method, a substantial gain in useable building volume may be achieve without the addition of a substantial cost to the overall structure.

While there has been shown and described herein a preferred form of the present invention and numerous modifications thereof have been suggested, other modifications thereof will readily suggest themselves to the skilled art worker and are contemplated by the present invention.

What is claimed is:

1. A method of constructing a building at least partially submerged in a body of water, comprising the steps of:
   (a) driving a plurality of vertically extending spaced apart piles into the bottom beneath the body of water;
   (b) constructing above the water line a bottom floor and a peripheral side wall connected thereto and extending upwardly therefrom;
   (c) movably supporting said bottom floor and said side wall on said piles;
   (d) causing said bottom floor and said side wall to move downwardly relative to said piles to immerse said bottom floor and at least a portion of said side wall below the surface of said water; and
   (e) after step d, fixing said bottom floor to at least one of said piles to prevent further relative movement between said bottom floor and said piles.

2. The method of claim 1, further comprising the steps of, prior to step e, erecting another floor structure above the water line and above said bottom floor structure, movably supporting said other floor structure on said piles, and joining said other floor structure to said peripheral side wall.

3. The method of claim 1, further comprising the step of, prior to causing the bottom floor to move downwardly, flooding with water a portion at least of the space above said bottom floor defined by said peripheral side wall and removing the flooding water after step e is completed.

4. A method of constructing a building at least partially submerged in a body of water, comprising the steps of:
   (a) driving a plurality of vertically extending spaced apart piles into the bottom beneath the body of water;
   (b) mounting on a portion of the piles above the surface of said body of water vertically extending structural members for vertical movement;
   (c) movably supporting said structural members on their respective piles;
   (d) erecting above the surface of said body of water a bottom floor structure for support by said structural members, and a peripheral side wall upwardly from said bottom floor structure;
   (e) causing said structural member to move downwardly relative to said piles into the body of water a sufficient distance to submerge said first floor and a portion at least of said side wall in said body of water; and
   (f) after step e, fixing at least one of said structural members to a pile for preventing further relative movement therebetween.

5. The method of claim 4, wherein said structural members are sleeves, and said sleeves are movably mounted on said piles by placing said sleeves in surrounding slidable relation with said piles.

6. The method of claim 4, further comprising the steps of, prior to step f, erecting above the water line and above said bottom floor structure another floor structure supported by said structural members, joining said other floor structure to said peripheral side wall, upwardly extending said peripheral side wall beyond the level of said other floor structure, and then causing said structural member to move downwardly relative to said piles a sufficient distance to submerge said other floor structure.

7. The method of claim 4, further comprising the step of, after step e, erecting above the water line on said piles another floor structure.

8. The method of claim 6, further comprising the step of, after said other floor structure has been submerged, erecting above the water line on said piles an additional floor structure.

9. The method of claim 8, wherein said structural members are sleeves, and said sleeves are movably mounted on said piles by placing said sleeves in surrounding slidable relation with said piles.

10. The method of claim 4, further comprising the steps of, in advance of step a, driving a plurality of temporary piles into said bottom, erecting on said temporary piles a portion at least of said bottom floor structure including said sleeves, and then disposing said first mentioned piles within said sleeves in sliding relation therewith.

11. The method of claim 4, further comprising the steps of, prior to step f, successively erecting above the water line a plurality of spaced apart upper floor structures each supported by said structural members, and successively extending upwardly said peripheral side wall to join each of said upper floor structures, and intermittently causing said structural members to move downwardly to successively submerge said upper floor structures.

12. The method of claim 4, and prior to at least one of said downward movements of said structural members, flooding with water at least a portion of the volume enclosed by said peripheral side wall and after completion of all of said downward movements of said structural members, removing the flooding water.

13. The method of claim 11, and after completion of all of said downward movements of said structural members, erecting at least one additional floor structure above said water line in supported relation with said piles.

14. The method of claim 13, wherein said structural members are sleeves, and said sleeves are movably mounted on said piles by placing said sleeves in surrounding slidable relation with said piles.

15. The method of claim 14, further comprising the steps of, in advance of step a, driving a plurality of temporary piles into said bottom, erecting on said temporary piles a portion at least of said bottom floor structure including said sleeves, and then disposing said first mentioned piles within said sleeves in sliding relation therewith.

16. The method of claim 5, wherein the erecting of the bottom floor structure comprises the steps of securing beams to said sleeves for support thereby.

17. The method of claim 16, wherein the erecting of the bottom floor structure further comprises positioning concrete on said beams for support thereby.

References Cited

UNITED STATES PATENTS

| | | | |
|---|---|---|---|
| 36,512 | 9/1862 | Du Bois | 61—50 |
| 2,007,498 | 7/1935 | Kida. | |
| 2,213,169 | 8/1940 | Ouchi. | |
| 2,274,082 | 2/1942 | McCammon. | |
| 2,972,342 | 2/1961 | Suderow. | |

FOREIGN PATENTS 943,818  10/1948  France.

JACOB SHAPIRO, Primary Examiner

U.S. Cl. X.R.

52—83; 61—50, 52

UNITED STATES PATENT OFFICE
CERTIFICATE OF CORRECTION

Patent No. 3,499,292          Dated March 10, 1970

Inventor(s) Carlos J. Tavares

It is certified that error appears in the above-identified patent and that said Letters Patent are hereby corrected as shown below:

Column 2, line 37: "relay" should read -- rely --. Column 3, line 32: after "like" insert -- or --. Column 7, line 44: after "portion" insert -- thereof, could be constructed above the water line and completed prior to lowering the entire submerged portion --; line 68: "jack" should read -- jacks --. Column 8, line 20: "thescope" should read -- the scope --; line 68: "achieve" should read -- achieved --. Column 9, line 61: "member" should read -- members --.

SIGNED AND SEALED
OCT 13 1970

(SEAL)
Attest:

Edward M. Fletcher, Jr.
Attesting Officer

WILLIAM E. SCHUYLER, JR.
Commissioner of Patents